United States Patent Office 2,907,805
Patented Oct. 6, 1959

2,907,805

PROCESS FOR THE PREPARATION OF LIQUID ETHYLENE POLYMERS

Herbert Bestian and Eberhard Prinz, Frankfurt am Main, Germany, assignors to Farbwerke Hoechst Aktiengesellschaft vormals Meister Lucius & Bruning, Frankfurt am Main, Germany, a corporation of Germany No Drawing. Application August 14, 1956
Serial No. 603,886

Claims priority, application Germany August 19, 1955

15 Claims. (Cl. 260—683.15)

It is known that liquid hydrocarbons are obtained by the polymerization of ethylene under the catalytic influence of anhydrous aluminum chloride. When applying pressures above 20 atmospheres and temperatures between 60 and 280° C. the polymerizations take place with industrially satisfactory speeds. Due to the high reaction temperatures there occur, during the polymerization, secondary reactions, partially catalyzed by the aluminum chloride, such as crackings, isomerization-, alkylation- and cyclization-reactions, by which can be partially explained the variety of the formed reaction products. The major part of the polymers obtained consists of saturated aliphatic and hydroaromatic hydrocarbons having an average molecular weight of about 80–2000. About 8% of the products are addition compounds of aluminum chloride and hydrocarbons from which, after hydrolytic splitting, there are obtained more or less unsaturated hydrocarbons which can scarcely be used in industry. The oils of high molecular weight and preponderantly containing saturated paraffins and naphthenes have good lubricating properties (good behavior at viscosity temperature, low solidifying points) when for the polymerization ethylene which has been purified according to the process of German patent specifications No. 718,130 and No. 767,929 is used and when the determined temperature directions according to the process of German patent specification No. 767,128 are observed.

As the yields of polymerization and the oil properties are influenced in a sensitive manner by the impurities and the nature of the surface (fine granulation) of the used aluminum chloride preparation and less the free aluminum chloride but rather the liquid olefin double compounds can be considered as the real polymerization catalysts, other authors (H. Zorn, Angew. Chem. A 60, 185 (1948)) studied the action of different halides such as $FeCl_3$, $TiCl_4$, $SiCl_4$, $HgCl_2$, $NO_2Cl_2$, $I_2$, LiCl, $SbCl_5$, $SnCl_4$, on the catalysis by $AlCl_3$. Furthermore there was examined the action of a compound of aluminum chloride and aluminum trimethyl of the formula $AlCl_3.Al(CH_3)_3$ admixed with $AlCl_3$ and readily soluble in carbon tetrachloride as well as in saturated hydrocarbons. Under the indicated conditions of reaction the catalytic action of $AlCl_3$ could not be increased by additions of the first mentioned halogen compound. An addition of the aluminum alkyl compound to the $AlCl_3$ polymerization batch showed, however, in the case of some experiments a favorable action on the yield and the behavior at viscosity temperature of the oils formed. Alone, that is in absence of aluminum chloride, this compound $(AlCl_3.Al(CH_3)_3)$ has no catalytic activity for the polymerization.

The action of a combination of catalysts consisting of halogen containing alumino-organic compounds and for example titanium tetrachloride was not described.

Now we have found that saturated or unsaturated liquid ethylene polymers can be produced by using as a catalyst dissolved halogen containing alumino-organic compounds and titanium-IV compounds in the presence of halogen-containing aliphatic or hydroaromatic hydrocarbons as solvents and reagents.

As alumino-organic constituents of the catalyst there may be used compounds of the type $AlR_mX_n$ wherein R represents alkyl, aryl, X represents halogen, $m$ is 1 or 2, $n$ 2 or 1 and $m+n$ represents 3; there may be mentioned for example dimethyl-, diethyl-, dipropyl-, di-isobutyl-, di-octyl-aluminum monochloride, monomethyl-, mono-ethyl-, monopropyl-, mono-isobutyl-, mono-octyl-aluminum dichloride or the corresponding bromine compounds or any mixture of the compounds mentioned. As titanium-containing constituents there may be used for the catalysis compounds of the type $TiR_mX_n$ wherein R represents aliphatic or isocyclic radicals, alkoxy or acetoxy radicals having 1–6 carbon atoms each, X represents halogen, $m$ the numbers 0, 1, 2, 3, or 4 and $n$ the numbers 4, 3, 2, 1 or 0 and $m+n$ represents 4, such as titanium tetrachloride, titanium tetrabromide, titanium tetramethylate, titanium tetraethylate, titanium tetrabutylate, titanium dichloride-diacetate, or titanium dichloride-diethylate. As solvents for the catalyst system there may be used aliphatic or hydroaromatic mono- or polyhalogen-hydrocarbons such as: carbon tetrachloride, carbon tetrabromide, trifluorobromomethane, trifluorochloromethane, trichlorobromomethane, tribromochloromethane, dichlorodifluoromethane, dibromodifluoromethane, dichlorodibromomethane, chloroform, bromoform, methylene chloride, methylene bromide, 1,1-dichloroethane, 1,1-dibromoethane, 1,2-dichloroethane, 1,2-dibromoethane, 1,1,1,2-tetrachloroethane, 1,1,1,2-tetrabromoethane, symmetrical tetrachloroethane, symmetrical tetrabromoethane, halogen propanes, halogen butanes, n-butyl chloride, n-butyl bromide, iso-butyl chloride, isobutyl bromide, tert.-butyl chloride, tert.-butyl bromide, tert.-amyl bromide, n-hexyl bromide, or cyclohexyl bromide.

The polymerization of ethylene according to the process of the present invention may be started, for example, by combining in a close container in a nitrogen atmosphere or an atmosphere of ethylene the two components of the catalyst, for example, titanium tetrachloride and aluminumdiethyl monocholoride in different, but preferably in about the same molar ratio in any order in the presence of one of the solvents mentioned above.

The solution of the two constituents which may be prepared in this or in any other way is especially active as a catalyst when the mixing is performed at sufficiently low temperatures, expediently below 30° C. and with the application of a ratio of dilution large enough, so that separations of solid constituents of the catalyst are avoided. Generally separations do not occur if the concentration of the titanium component of the catalyst is below 150 millimoles per liter of solvent.

In the case of most of the systems, it is expedient to work with about 5–20 millimoles of the catalyst component of titanium per liter of solvent. The solid constituents which may separate catalyze a secondary reaction, which leads to the formation of insoluble ethylene polymers of high molecular weight. In the halogen-containing solvents mentioned above the polymerization takes place with the application of such catalytic solutions in a range of temperature of below −100° C. to +100° C., preferably between −60° C. and +50° C. under pressures between atmospheric pressure and a pressure of 100 atmospheres gauge with high speed which is nearly constant for many hours when there are continuously added in doses, during the polymerization small amounts of the aluminum-containing catalyst constituent. The reaction can be carried out at a sufficient speed even under a pressure below 1 atmosphere.

Whereas the reaction velocity decreases slowly while the experimental temperature increases, the possibility of performing the process in the direction of extremely low temperatures is practically only limited by the melting point of the solvent used in each case.

The liquid hydrocarbons formed when applying one of the processes mentioned can be easily isolated, if necessary after the separation of the solid secondary products, by means of any known finishing process which causes a hydrolytic splitting and the elimination of the remaining catalyst components. It is possible, for example, to stir the filtered solution of reaction with water, dilute acids or bases, to wash it until the reaction is neutral and to concentrate it if necessary under reduced pressure after having been dried.

The products so obtained are transparent, yellow to colorless oils, the tints of which may be clarified considerably by a treatment with bleaching earth. The chlorine content is on the average between 0.1 and 0.8%.

The average molecular weight of the liquid polymerization products is between 100 and 3000. Within this range the average molecular weight and thus the viscosity may be varied largely by the appropriate selection of the solvent and also by varying the polymerization temperature in such a manner that, with the raise of temperature the viscosity surprisingly increases and vice versa, i.e. the viscosity changes directly with the temperature.

The olefin content of the liquid polymers also varies depending on the solvent applied and the temperature of polymerization in the manner that, with the decrease of temperature the percentage of olefins increases. Since in the case of the same conditions of temperature the average molecular weight decreases, it is possible to prepare by appropriate steps olefins of low molecular weight within the interesting range of $C_4$-$C_{36}$.

By the application of higher temperatures of polymerization it is possible to obtain mostly saturated hydrocarbons of high molecular weight in the form of more or less viscous oils. The average molecular weight of these oils is between 200 and 3000, especially between 500 and 1500. It can be regulated as desired within this range according to the selection of the solvent and the temperature. These reaction products of high molecular weight constitute yellow to colorless limpid and transparent oils, which are distinguished by a good behavior at the viscosity temperature, low solidifying points and excellent aging stability. With reference to these important lubricating properties the hydrocarbons of high molecular weight prepared according to the process of the present invention are superior to the natural lubricating oils and the oils of polyethylene hitherto known.

The process according to the invention can be performed continuously or discontinuously.

With regard to the mechanism of polymerization the conditions prevailing in the new process are different from the conditions in the known or proposed processes. The essential feature of the catalyst system consists in the fact that under the conditions of polymerization described it is dissolved homogeneously in the chlorinated hydrocarbons and that it has no reducing action worth mentioning. Neither when preparing the catalyst system nor during the polymerization does there take place an action of the halogen-containing alumino-organic compounds on the titanium-IV compounds in the sense of a transformation into titanium compounds of low valency.

The following examples serve to illustrate the invention but they are not intended to limit it thereto.

Example 1

In a closed container having a volume of 3.5 liters and provided with a tube to introduce a gas, a reflux condenser, a stirrer and a dropping device, there are dissolved in 1.7 liters of chloroform 9 cc. of aluminumethyl sesquichloride (equimolecular mixture of monoethylaluminum dichloride and diethylaluminum monochloride) and there are added dropwise, while stirring, at 15° C., a solution of 2 cc. of $TiCl_4$ in 200 cc. of chloroform, while simultaneously introducing ethylene. After the addition of about 50 cc. of the $TiCl_4$ solution the absorption of ethylene starts and increases within a few minutes to 170–180 liters per hour. The rest of the $TiCl_4$ solution is added dropwise whereby a yellow to orange-colored limpid catalyst solution is formed. After the decrease of the absorption of ethylene to about 100 to 120 liters per hour the speed of the polymerization is kept nearly constant at an invariable temperature (15° C.) by adding dropwise a solution of ethylaluminum sesquichloride (in chloroform) of 8% by volume. After a period of reaction of 8 hours the polymerization is interrupted at an absorption of ethylene of about 80 l./h. The slightly turbid orange-colored solution of polymerization is filtered, decomposed with ice water whereby it becomes completely colorless, it is washed with a solution of sodium bicarbonate and finally with water, until the reaction becomes neutral and dried over sodium sulfate or calcium chloride. After evaporating the solvent, finally under reduced pressure (1 mm. of Hg) at 100° C. there are obtained 975 grams of a yellow viscous limpid and transparent oil. The total consumption of aluminumethyl sesquichloride amounts to 43 grams.

Properties of the oil:
(1) Molecular weight _____ 750 (cryoscopic in benzene).
(2) Chlorine content _____ 0.2%.
(3) Ash content _____ <0.01%.
(4) Hydrogenation iodine number _____ 10.4.

After distillation under a pressure of 8 mm. of Hg at 180° C. to eliminate the portions of low molecular weight (5% of the total polymer) the oily residue had the following properties:

(1) Viscosities:
    At 20° C., 811 centistokes
    At 50° C., 149.6 centistokes
    At 99° C., 26.5 centistokes
(2) Latitude of viscosity, 1.4 (defined in "Zur Viskosimetrie," L. Ubbelohde, edition S. Hirzel, Leipzig, 1943, page 12)
(3) Solidifying point, −39° C.
(4) Density, $d_4^{20}$, 0.840

Example 2

The catalytic solution is prepared as described in Example 1 with 9 cc. of ethyl aluminum sesquichloride and 2.0 cc. of $TiCl_4$ at 15° C. in the same solvent. Subsequent to the start of the absorption of ethylene the temperature is raised to 40° C. and the polymerization is continued for 7 hours. The solution of polymerization is then mixed with water, washed with a solution of bicarbonate and water until the reaction is neutral, dried and the solvent is finally distilled off for one hour under a pressure of 0.5 mm. of Hg and at 100° C. The total consumption of ethyl aluminum sesquichloride amounts to 43 grams. The yield amounts to 643 grams of a transparent reddish brown oil.

Properties of the polymer:
(1) Molecular weight _____ 1160 (cryoscopic in benzene).
(2) Chlorine content _____ 0.63%.
(3) Ash content _____ <0.01%.
(4) Hydrogenation iodine number _____ 0.2.
(5) Density $d_4^{20}$ _____ 0.8412.
(6) Viscosities—
    At 20° C. _____ 3883 centistokes.
    At 50° C. _____ 613 centistokes.
    At 99° C. _____ 91.9 centistokes.
(7) Latitude of viscosity _____ 1.40.
(8) Solidifying point _____ −22° C.

Example 3

1 cc. of TiCl₄ is dissolved in 1.5 liters of 1,2-dichloroethane and a solution of ethyl aluminum sesquichloride of 16% strength in 1,2-dichloroethane is added dropwise to the solution, while stirring and simultaneously introducing ethylene. After the start of the reaction the temperature of the dissolved catalyst system is allowed to decrease to 0° C. and the polymerization is continued at this temperature. By continuously adding the sesquichloride solution of 16% strength the velocity of polymerization is maintained at about 100 liters per hour for 10 hours. In order to isolate the reaction products the polymerization mixture is filtered off with suction, mixed with icewater, while stirring, and finished as described in Example 2. The last residues of the solvent are distilled off at 70° C. under a pressure of 50 mm. of Hg. In this way there are obtained 1065 grams of a limpid, transparent, slightly yellow liquid. The total consumption of aluminum sesquichloride amounts to 42 grams.

Properties of the polymer:
(1) Molecular weight _____ 365 (cryoscopic in benzene).
(2) Chlorine content _____ 0.57.
(3) Hydrogenation iodine number _____ 30.9.
(4) Density $d_4^{20}$ _____ 0.8229.

At a bath temperature of 220° C. under a pressure of 1 mm. of Hg 36% of the total polymer can be distilled. Properties of the distillation fractions:

| fraction no. | boiling point, °C. | pressure, mm. of Hg | quantity, percent¹ | $d_4^{20}$ | $n_D^{20}$ | hydrogenation iodine no. | molecular weight |
|---|---|---|---|---|---|---|---|
| 1 | 37–63 | 2 | 11.2 | 0.7672 | 1.4353 | 117.3 | 166 |
| 2 | 95–114 | 4 | 11.5 | 0.7822 | 1.4410 | 114.0 | 209 |
| 3 | 108–130 | 4 | 11.2 | 0.7917 | 1.4453 | 117.5 | 214 |
| 4 | 130–141 | 4 | 11.2 | 0.7955 | 1.4488 | 105.4 | 267 |
| 5 | 141–148 | 4 | 11.5 | 0.7980 | 1.4488 | 99.9 | 280 |
| 6 | 148–162 | 4 | 11.5 | 0.8030 | 1.4530 | 6.8 | 288 |
| residue | | | 29 | 0.8171 | 1.4570 | 3.1 | 331 |

¹ Percent content related to the total amount of the portion which can be distilled.

Example 4

To a solution of 4.5 cc. of aluminumethyl sesquichloride in 475 cc. of 1,1,2,2-tetrachloroethane are added dropwise, while permanently stirring and introducing ethylene at 15° C., a solution of 1.0 cc. of TiCl₄ in 25 cc. of tetrachloroethane. After the addition of the TiCl₄ solution the dissolved catalyst system is cooled to −15° C. and the absorption of ethylene is maintained at about 50 liters per hour by adding continuously a solution of aluminumethyl sesquichloride of 16% strength. After a period of polymerization of 7 hours the solution of reaction is mixed with icewater, whereby it becomes nearly colorless, it is finished as described in Example 2 and finally freed from the residues of the solvent for one hour under a pressure of 2 mm. of Hg at 120° C. The yield amounts to 331 grams of a yellow, limpid, transparent liquid.

Properties of the polymer:
(1) Molecular weight _____ 305 (cryoscopic in benzene).
(2) Chlorine content _____ 0.56%.
(3) Hydrogenation iodine number _____ 61.7.
(4) Ash content _____ <0.01%.
(5) $d_4^{20}$ density _____ 0.8190.
(6) $n_D^{20}$ density _____ 1.4580.

Example 5

A solution of 2.0 cc. of TiCl₄ in 1.5 liters of methylene chloride is cooled to −55° C. in a current of ethylene while permanently stirring and the polymerization is started by adding dropwise a solution of aluminumethyl sesquichloride of 16% strength. The catalyst system is present as a solution in methylene chloride. By continuously activating with sesquichloride solution the velocity of the polymerization is maintained at about 80 liters per hour in the course of 9½ hours at a constant temperature. The solution of polymerization is then decomposed with icewater. After the usual finishing, the material is heated for one hour under a pressure of 250 mm. of Hg at 100° C. The yield amounts to 646 grams of a colorless thin liquid. The total consumption of ethylaluminum sesquichloride is 38 grams.

Properties of the polymer:
(1) Molecular weight _____ 263 (cryoscopic in benzene).
(2) Chlorine content _____ 0.34%.
(3) Hydrogenation iodine number _____ 92.6.
(4) $d_4^{20}$ density _____ 0.8165.
(5) $n_D^{20}$ density _____ 1.4565.

We claim:
1. A process for the preparation of liquid ethylene polymers which comprises the steps of contacting ethylene at a temperature from about −100° C. to +100° C. under a pressure from about atmospheric to about 100 atmospheres gauge with a catalytic amount of a catalyst system containing two catalytically active components dissolved in a liquid halogenated hydrocarbon selected from the group consisting of halogenated aliphatic hydrocarbons and halogenated hydroaromatic hydrocarbons, one component of said catalyst being a halogen-containing alumino-organic compound and the other being a titanium compound of the general formula

$$TiR_mX_n$$

wherein R represents a member selected from the group consisting of aliphatic, isocyclic, alkoxy or acetoxy radicals having 1–6 carbon atoms each, X represents a halogen, and m and n are integers from 0–4, the sum of m+n being 4.

2. A process according to claim 1 wherein the concentration of the titanium catalyst component is below 150 millimoles per liter of halogenated hydrocarbon so as to avoid separation of the titanium component from the catalyst mixture.

3. A process according to claim 1, wherein the dissolved catalyst is prepared in situ, while simultaneously introducing ethylene.

4. A process for the preparation of liquid ethylene polymers which comprises the steps of contacting ethylene at a temperature from about −100° C. to +100° C. under a pressure from about atmospheric to about 100 atmospheres gauge with a catalytic amount of a catalyst system containing two catalytically active components dissolved in a liquid halogenated hydrocarbon selected from the group consisting of halogenated aliphatic hydrocarbons and halogenated hydroaromatic hydrocarbons, one component of said catalyst being a halogen-containing alumino-organic compound and the other being titanium tetrachloride.

5. The process of claim 4, wherein the halogenated hydrocarbon is chloroform.

6. The process of claim 4, wherein the halogenated hydrocarbon is dichlorethane.

7. The process of claim 4, wherein the halogenated hydrocarbon is methylene chloride.

8. The process of claim 4, wherein the halogenated hydrocarbon is chloromethane.

9. The process of claim 4, wherein the halogenated hydrocarbon is chloroethane.

10. The process of claim 4, wherein the halogen-containing aluminum organic compound is aluminum ethyl sesquichloride.

11. The process of claim 4, wherein the halogen-containing aluminum organic compound is aluminum methyl sesquichloride.

12. The process of claim 4, wherein the halogen-containing aluminum organic compound is dimethyl aluminum chloride.

13. The process of claim 4, wherein the halogen-containing aluminum organic compound is methyl aluminum dichloride.

14. The process of claim 4, wherein the halogen-containing aluminum organic compound is ethyl aluminum dichloride.

15. A process for the preparation of a liquid ethylene polymer which comprises dissolving a small amount of ethyl aluminum sesquichloride in chloroform, adding dropwise a 1% by volume solution of titanium tetrachloride in chloroform while simultaneously introducing ethylene into the mixture at 15° C., adding an 8% by volume solution of ethyl aluminum sesquichloride in chloroform while continuing the introduction of ethylene, filtering the reaction liquid, treating it with ice-water, washing it with a sodium bicarbonate solution and finally with water, drying it and removing the solvent under reduced pressure at 100° C.

References Cited in the file of this patent

UNITED STATES PATENTS

| | | |
|---|---|---|
| 2,270,292 | Grosse | Jan. 20, 1942 |
| 2,387,517 | Kraus | Oct. 23, 1945 |
| 2,440,498 | Young et al. | Apr. 27, 1948 |
| 2,603,665 | Young | July 15, 1952 |
| 2,699,457 | Ziegler et al. | Jan. 11, 1955 |
| 2,721,189 | Anderson et al. | Oct. 18, 1955 |

FOREIGN PATENTS

| | | |
|---|---|---|
| 534,792 | Belgium | Jan. 31, 1955 |